United States Patent
Syniacheva et al.

(10) Patent No.: US 12,487,173 B2
(45) Date of Patent: Dec. 2, 2025

(54) PORTABLE CO2 MEASURING DEVICE AND SYSTEM

(71) Applicant: WOODENSHARK LLC, Wilmington, DE (US)

(72) Inventors: Oleksandra Syniacheva, Berlin (DE); Dmitry Gorilovsky, Berlin (DE)

(73) Assignee: WOODENSHARK LLC, Wilmington, DE (US)

( * ) Notice: Subject to any disclaimer, the term of this patent is extended or adjusted under 35 U.S.C. 154(b) by 155 days.

(21) Appl. No.: 18/022,363

(22) PCT Filed: Aug. 18, 2021

(86) PCT No.: PCT/US2021/046410
§ 371 (c)(1),
(2) Date: Feb. 21, 2023

(87) PCT Pub. No.: WO2022/040253
PCT Pub. Date: Feb. 24, 2022

(65) Prior Publication Data
US 2023/0324289 A1    Oct. 12, 2023

(30) Foreign Application Priority Data

Aug. 18, 2020  (GB) ..................................... 2012875
Mar. 23, 2021  (GB) ..................................... 2104048

(51) Int. Cl.
G01N 21/3504    (2014.01)
G01N 33/00      (2006.01)
G08B 21/14      (2006.01)

(52) U.S. Cl.
CPC ..... *G01N 21/3504* (2013.01); *G01N 33/0063* (2013.01); *G08B 21/14* (2013.01)

(58) Field of Classification Search
CPC ........... G01N 21/3504; G01N 33/0063; G01N 33/004
See application file for complete search history.

(56) References Cited

U.S. PATENT DOCUMENTS 6,190,327 B1  2/2001  Isaacson et al.
8,395,510 B1  3/2013  Kirk
(Continued)

FOREIGN PATENT DOCUMENTS

WO    2019204789 A1    10/2019

OTHER PUBLICATIONS

Vincent et al. "A low cost MEMS based NDIR system for the monitoring of carbon dioxide in breath analysis at ppm levels," Sensors and Actuators B: Chemical, vol. 236, pp. 954-964, Nov. 2016. (Year: 2016).*
(Continued)

*Primary Examiner* — David P Porta
*Assistant Examiner* — Meenakshi S Sahu
(74) *Attorney, Agent, or Firm* — Saul Ewing LLP

(57) ABSTRACT

There is disclosed a system including a portable CO2 measuring device and a mobile device, the mobile device including a processor and a display, the mobile device storing software, the mobile device configured to communicate with the portable CO2 measuring device, the portable CO2 measuring device configured to measure CO2 measurement data, wherein the software is executable on the mobile device to receive the CO2 measurement data from the CO2 measuring device, and to display CO2 measurement results derived from the CO2 measurement data on the display of the mobile device.

22 Claims, 18 Drawing Sheets

(56) References Cited

U.S. PATENT DOCUMENTS

| | | |
|---|---|---|
| 9,182,751 B1 | 11/2015 | Reeder |
| 10,080,510 B2 * | 9/2018 | Gedeon ................ A61B 5/0816 |
| 2008/0127726 A1 | 6/2008 | Elkins |
| 2016/0245830 A1 | 8/2016 | Mace et al. |
| 2018/0372662 A1 | 12/2018 | Boudaden et al. |

OTHER PUBLICATIONS

International Search Report, dated Nov. 24, 2021, and Written Opinion issued in priority International Application No. PCT/US21/46410.

* cited by examiner

| CO2, ppm | Number of segments on | Brain Fuel index | Description |
|---|---|---|---|
| Less than 449 | 9 | Ideal | Air composition optimal for productive work. |
| 450 - 499 | 8 | | |
| 500 - 599 | 7 | | |
| 600 - 699 | 6 | Fair | These CO2 concentrations might impair brain performance. |
| 700 - 799 | 5 | | |
| 800 - 899 | 4 | | |
| 900 - 999 | 3 | Poor | CO2 concentration is too high and significantly decreases cognitive capabilities. |
| 1000 - 1499 | 2 | | |
| more than 1500 | 1 | | |

FIGURE 6 ature of the invention relates to portable CO2 measuring devices, and to systems including portable CO2 measuring devices.

PORTABLE CO2 MEASURING DEVICE AND SYSTEM

CROSS REFERENCE TO RELATED APPLICATIONS

This application claims the priority of International Application No. PCT/US2021/046410, filed on Aug. 18, 2021, which claims priority to GB Applications Nos. GB 2012875.7, filed on Aug. 18, 2020; and GB 2104048.0, filed on Mar. 23, 2021, the entire contents of which are fully incorporated herein by reference.

BACKGROUND OF THE INVENTION

1. Field of the Invention

The field of the invention relates to portable CO2 measuring devices, and to systems including portable CO2 measuring devices.

2. Technical Background

Carbon dioxide concentration is one of the environmental factors that affect brain activity and, as a result, human well-being and productivity. Scientists at University College London (UCL) found that higher concentrations of CO2 reduce memory, impair concentration, and lower decision-making capabilities ["Possible future impacts of elevated levels of atmospheric CO2 on human cognitive performance and on the design and operation of ventilation systems in buildings" by Robert J Lowe, Gesche M Huebner, Tadj Oreszczyn. First Published: Jul. 20, 2018]. That paper adds to a body of research into the effect of elevated CO2 levels on brain function. Poorly ventilated workplaces could adversely affect employees' cognitive performance, a Harvard study found ["Associations of Cognitive Function Scores with Carbon Dioxide, Ventilation, and Volatile Organic Compound Exposures in Office Workers: A Controlled Exposure Study of Green and Conventional Office Environments" by Joseph G. Allen, Piers MacNaughton, Usha Satish, Suresh Santanam, Jose Vallarino, and John D. Spengler. Published: 1 Jun. 2016]. Another study by the Yale School of Public Health found a significant reduction in language and mathematics test scores among participants exposed to polluted air [The impact of exposure to air pollution on cognitive performance, Xin Zhang, Xi Chen, and Xiaobo Zhang. First Published Aug. 27, 2018].

3. Discussion of Related Art

Despite a few portable air quality sensors being on the market, most of these devices use chemoresistant MOS sensors to measure VOC (volatile organic compounds), IAQ (Indoor Air Quality). These sensors measure different mixes of compounds such as alcohol, formaldehyde, smoke, and others. Some of these devices also show 'CO2 level', but this number is calculated, not measured directly. These measurements may be used to check the overall air quality but don't give any clue as to how the air composition affects people's brain performance. On the other hand, there are a few non-portable sensors that can measure CO2 levels directly, but all of these need an external power supply and are too big and bulky to carry.

SUMMARY OF THE INVENTION

According to a first aspect of the invention, there is provided a system including a portable CO2 measuring device and a mobile device, the mobile device including a processor and a display, the mobile device storing software, the mobile device configured to communicate with the portable CO2 measuring device, the portable CO2 measuring device configured to measure CO2 measurement data, wherein the software is executable on the mobile device to receive the CO2 measurement data from the CO2 measuring device, and to display CO2 measurement results derived from the CO2 measurement data on the display of the mobile device.

An advantage is that a user can know the CO2 level to which they are exposed, while the user is moving from place to place. An advantage is that a user can know the CO2 level to which they are exposed, in various locations, without reconfiguring the system. An advantage is that a user can know if they are exposed to unsafe or undesirable levels of CO2, in all the locations in which they spend some time, during a period of time, e.g. a day. An advantage is that a user's health may be improved, because they can avoid undesirable levels of CO2. An advantage is that a user's productivity may be improved, because they can avoid undesirable levels of CO2.

The system may be one wherein the portable CO2 measuring device is configured to directly measure CO2 concentration. An advantage is greater accuracy compared to systems that only infer or deduce CO2 levels.

The system may be one wherein the portable CO2 measuring device is configured to directly measure CO2 concentration in real time. An advantage is that a user can respond more quickly to the CO2 level, which can provide improved user health, or improved user productivity.

The system may be one wherein the portable CO2 measuring device is configured to perform periodical measurements of CO2. An advantage is that a user can respond more reliably to the CO2 level, which can provide improved user health, or improved user productivity.

The system may be one wherein the portable device includes a non-dispersive infrared sensor arranged to measure CO2 concentration, to measure CO2 measurement data. An advantage is greater accuracy compared to systems that only infer or deduce CO2 levels. An advantage is a more compact portable device.

The system may be one wherein the CO2 measurement data includes Brain Fuel level. An advantage is a more user-intuitive provision of data.

The system may be one wherein the portable CO2 measuring device includes a fastener. An advantage is a predetermined secure attachment of the portable CO2 measuring device to an article.

The system may be one wherein the portable CO2 measuring device includes a USB slot.

The system may be one wherein the portable CO2 measuring device includes a removable cap or cover. An advantage is protection of contents of the portable CO2 measuring device.

The system may be one wherein the portable CO2 measuring device includes a USB slot, wherein when the cap or cover is in the open configuration the USB slot is exposed, and when the cap or cover is in the closed configuration, the cap or cover protects the USB slot. An advantage is protection of the USB slot.

The system may be one wherein the cap or cover is attached to the portable CO2 measuring device using an elastic band.

The system may be one wherein when CO2 measurement data indicates CO2 concentration values over 1500 ppm, a notification is sent to the mobile device. An advantage is rapid notification to a user of possibly dangerous CO2 levels.

The system may be one wherein the portable CO2 measuring device includes a (e.g. LCD) display.

The system may be one wherein when CO2 measurement data indicates CO2 concentration values over 1500 ppm, a unique signal is provided on the (e.g. LCD) measuring device display in response, e.g. a blinking segment. An advantage is rapid notification to a user of possibly dangerous CO2 levels.

The system may be one wherein the portable CO2 measuring device is configured to display on its display an indication that is inversely proportional to a CO2 level measured by the portable CO2 measuring device. An advantage is a more user-intuitive provision of data.

The system may be one wherein the indication is comprised of segments, or of a segmented bar.

The system may be one wherein the CO2 measurement results displayed on the display of the portable CO2 measuring device include Brain Fuel level.

The system may be one wherein the "Brain Fuel" scale is such that the user can more easily associate the indication with their brain performance.

The system may be one wherein the portable CO2 measuring device is configured to display on its display an indication of the portable CO2 measuring device's battery charge level.

The system may be one wherein the portable CO2 measuring device includes a button arranged to turn the portable CO2 measuring device on or off.

The system may be one wherein the maximum dimension of the portable device that measures the CO2 concentration is less than 15.0 cm. An advantage is a high level of portability, which means that a user can know the CO2 level to which they are exposed, while the user is moving from place to place.

The system may be one wherein the maximum dimension of the portable device that measures the CO2 concentration is less than 10.0 cm. An advantage is a high level of portability, which means that a user can know the CO2 level to which they are exposed, while the user is moving from place to place.

The system may be one wherein the maximum dimension of the portable device that measures the CO2 concentration is less than 5.0 cm. An advantage is a high level of portability, which means that a user can know the CO2 level to which they are exposed, while the user is moving from place to place.

The system may be one wherein the portable device that measures the CO2 concentration has a weight less than 100 g. An advantage is a high level of portability, which means that a user can know the CO2 level to which they are exposed, while the user is moving from place to place.

The system may be one wherein the portable device that measures the CO2 concentration has a weight less than 50 g. An advantage is a high level of portability, which means that a user can know the CO2 level to which they are exposed, while the user is moving from place to place.

The system may be one wherein the portable device that measures the CO2 concentration has a weight less than 25 g. An advantage is a high level of portability, which means that a user can know the CO2 level to which they are exposed, while the user is moving from place to place.

The system may be one wherein the portable device that measures the CO2 concentration can be attached to a bag, or to a keychain. An advantage is a high level of portability, which means that a user can know the CO2 level to which they are exposed, while the user is moving from place to place.

The system may be one wherein the system includes an external portable module with additional sensors for sensing one or more of: Volatile organic compounds (VOC), Formaldehyde (HCHO), Radon, ultraviolet (UV), carbon monoxide (CO), pressure, pm0.1 (particulate matter with an average aerodynamic diameter of up to 0.1 μm, referred to as ultrafine particle fraction) or ozone, and the external portable module is configured to transmit related measurement data to the mobile device for display. An advantage is that a user's health may be improved, because they can avoid undesirable levels of environmental exposure. An advantage is that a user's productivity may be improved, because they can avoid undesirable levels of environmental exposure.

The system may be one wherein the portable device is also an air composition measuring device and is configured to measure one or more other quantities (or all quantities) selected from VOCs, HCHO, Radon, CO, UV, ozone, air pressure, pm0.1 (particulate matter with an average aerodynamic diameter of up to 0.1 μm, referred to as ultrafine particle fraction), using respective sensors, and to transmit related measurement data to the mobile device. An advantage is that a user's health may be improved, because they can avoid undesirable levels of environmental exposure. An advantage is that a user's productivity may be improved, because they can avoid undesirable levels of environmental exposure.

The system may be one wherein the mobile device is configured to calculate an index based on received sensor data from all sensors which transmit sensor data to the mobile device, and to display the index on the screen of the mobile device. An advantage is that a user's health may be improved, because they can avoid undesirable levels of environmental exposure. An advantage is that a user's productivity may be improved, because they can avoid undesirable levels of environmental exposure.

The system may be one, wherein the system includes a GSM/NarrowBand-Internet of Things (NB-IoT) module, wherein the module is within the portable device, or wherein the module is outside the portable device and outside the mobile device. An advantage is ease of data reporting to external data collectors.

The system may be one wherein the portable device includes a rechargeable built-in battery.

The system may be one wherein the battery life in normal use is at least 150 days.

The system may be one wherein the portable device sends an alert to the mobile device if a battery level of the portable device is below a predefined level.

The system may be one wherein the portable device includes humidity and/or temperature sensors, the sensors configured to transmit sensor data to the mobile device.

The system may be one wherein the portable device has a Reuleaux triangle shape in cross-section. An advantage is the shape may be gripped securely.

The system may be one wherein the portable device is arranged to receive user interaction only through a single pressable button that is present on the portable device.

The system may be one wherein to turn the CO2 measuring device on or off, a user should press and hold the button until the CO2 measuring device display indicates switching the measuring device's state.

The system may be one wherein when turned ON, the CO2 measuring device checks if there is a paired device in the vicinity, and if any is present, the measuring device tries to establish a connection with the paired device.

The system may be one wherein the $CO_2$ measuring device is configured to notify a user of air composition state by sending push notifications to the mobile device. An advantage is communication of air composition, even when the $CO_2$ measuring device cannot be seen.

The system may be one wherein the $CO_2$ measuring device is configured to send to the mobile device $CO_2$ or Brain Fuel level data, and the mobile device is configured to display the data on an app widget on the mobile device. An advantage is communication of $CO_2$ or Brain Fuel level data, even when the software does not have the main control of the display output.

The system may be one wherein the mobile device is configured to communicate with the portable $CO_2$ measuring device wirelessly. An advantage is that the portable $CO_2$ measuring device can be out of sight (e.g. inside a back pack but with direct access to the outside air) while the mobile device screen is not out of sight.

The system may be one wherein the mobile device is configured to communicate with the portable $CO_2$ measuring device using a short-range wireless connection (e.g. Bluetooth). An advantage is that the portable $CO_2$ measuring device can be out of sight (e.g. inside a back pack but with direct access to the outside air) while the mobile device screen is not out of sight.

The system may be one wherein the software is executable on the mobile device to pair the mobile device with the portable $CO_2$ measuring device (e.g. using Bluetooth).

The system may be one wherein pairing the mobile device with the portable $CO_2$ measuring device includes: enabling Bluetooth for the software; pairing the $CO_2$ measuring device with the mobile device, e.g. following the software on-screen instructions; once paired, the measuring device is configured to synchronize the $CO_2$ measurement data on the measuring device with the software on the mobile device.

The system may be one wherein the software is executable on the mobile device to unpair the mobile device with the portable $CO_2$ measuring device (e.g. using Bluetooth).

The system may be one wherein the software is executable on the mobile device to upgrade firmware on the portable $CO_2$ measuring device (e.g. using Bluetooth). An advantage is that criteria for transmitting data from the portable $CO_2$ measuring device to the mobile device may be set or modified.

The system may be one wherein the software is executable on the mobile device such that the user experience is extended with animated guidance on breathing techniques. An advantage is that a user's health may be improved. An advantage is that a user's productivity may be improved.

The system may be one wherein the software is executable on the mobile device to provide a notification relating to the $CO_2$ measurement data. An advantage is that the portable $CO_2$ measuring device can be out of sight (e.g. inside a back pack but with direct access to the outside air) while the mobile device screen is not out of sight.

The system may be one wherein the software is executable on the mobile device to send or to receive push notifications at the mobile device when the $CO_2$ level is above a predefined level. An advantage is that the portable $CO_2$ measuring device can be out of sight (e.g. inside a back pack but with direct access to the outside air) while the mobile device screen is not out of sight.

The system may be one wherein the mobile device is configured to provide an application widget providing relevant information about the air a user is breathing. An advantage is that a user's health may be improved. An advantage is that a user's productivity may be improved.

The system may be one wherein the mobile device is configured to provide an application widget providing $CO_2$ measurement results on a home screen of the mobile device. An advantage is that the portable $CO_2$ measuring device can be out of sight (e.g. inside a back pack but with direct access to the outside air) while the mobile device screen is not out of sight.

The system may be one wherein the application widget provides the $CO_2$ measurement results on the home screen of the mobile device, even when the software is executing in the background. An advantage is improved availability of the $CO_2$ measurement results.

The system may be one wherein the $CO_2$ measurement results displayed on the display of the mobile device include Brain Fuel level.

The system may be one wherein the "Brain Fuel" scale is such that the user can more easily associate the indication with their brain performance.

The system may be one wherein the software is executable on the mobile device to provide an intuitively understandable indication of whether the air composition adds to a user's productivity.

The system may be one wherein the software is executable on the mobile device to colour the screen of the mobile device in relation to $CO_2$ measurement data.

The system may be one wherein the $CO_2$ measurement results displayed on the display of the mobile device include Brain Fuel level or $CO_2$ level as a function of time. An advantage is improved understanding of when a user may have been exposed to elevated $CO_2$ levels.

The system may be one wherein the function of time is selectable to display average Brain Fuel level or $CO_2$ level hour-by-hour, day-by-day, month-by-month, or year-by-year.

The system may be one wherein the software is executable on the mobile device to provide practical recommendations in relation to the $CO_2$ measurement results.

The system may be one wherein the software is executable on the mobile device to calculate an integrated index based on all received measurement data from the portable device and to display data relating to the integrated index on the display of the mobile device. An advantage is that a user can know if they are exposed to unsafe or undesirable environmental conditions, in all the locations in which they spend some time, during a period of time, e.g. a day. An advantage is that a user's health may be improved, because they can avoid undesirable environmental conditions. An advantage is that a user's productivity may be improved, because they can avoid undesirable environmental conditions.

The system may be one wherein the mobile device is a mobile phone, a smartphone, a tablet computer, or a smart watch.

The system may be one wherein the software is executable on the mobile device to output charts, and detailed data relating to data received from the $CO_2$ measuring device.

The system may be one wherein the mobile device is configured to receive from the portable $CO_2$ measuring device the portable $CO_2$ measuring device's (e.g. precise, e.g. to nearest 1%) battery charge level, wherein the mobile device is configured to display on its display the portable $CO_2$ measuring device's (e.g. precise, e.g. to nearest 1%) battery charge level.

The system may be one wherein the software is an app downloadable from a server, or the software is installed during mobile device manufacture, or the software is part of an operating system of the mobile device.

The system may be one wherein the software is configured to communicate with other healthcare, wellbeing, or lifestyle software applications.

The system may be one wherein the mobile device is configured to synchronize the App with a GitHub account or sports/health trackers to display an additional chart: e.g. productivity superimposed on the CO2 concentration, and optionally productivity superimposed on sensor data from any other sensor incorporated in the portable CO2 measuring device.

According to a second aspect of the invention, there is provided the portable CO2 measuring device of a system of any aspect of the first aspect of the invention.

According to a third aspect of the invention, there is provided the mobile device of a system of any aspect of the first aspect of the invention.

According to a fourth aspect of the invention, there is provided the software of a system of any aspect of the first aspect of the invention.

Aspects of the invention may be combined.

BRIEF DESCRIPTION OF THE FIGURES

Aspects of the invention will now be described, by way of example(s), with reference to the following Figures, in which:

FIG. 6 shows a table showing an example CO2 measuring device (e.g. LCD) display indication logic.

DETAILED DESCRIPTION

There is disclosed a smart air composition meter and system.

We provide a portable air composition measurement system that provides the user with real-time information about whether the air in their environment is suitable for productive work. The system includes a portable device that measures the CO2 concentration in the air directly, giving a user a clear understanding of how the air composition impacts their cognitive capabilities. Furthermore, the air composition may be displayed on a "Brain Fuel" scale so that the user can more easily associate the indication with their brain performance—the higher the CO2 level, the lower is the Brain Fuel and the user's productivity—so the user can act accordingly. The measuring device may be small and portable so that it can be carried anywhere: e.g. office, coworking space, apartment, etc. Due to its constructional design, the measuring device can be attached to a bag, keychain, or anything else, making it even easier to stay informed of air composition wherever the user goes. In an example, the maximum dimension of the portable device that measures the CO2 concentration is less than 15.0 cm. In an example, the maximum dimension of the portable device that measures the CO2 concentration is less than 10.0 cm. In an example, the maximum dimension of the portable device that measures the CO2 concentration is less than 5.0 cm. In an example, the portable device that measures the CO2 concentration has a weight less than 100 g. In an example, the portable device that measures the CO2 concentration has a weight less than 50 g. In an example, the portable device that measures the CO2 concentration has a weight less than 25 g.

"Brain Fuel" is a rating of how air composition affects people's cognitive functions, decision-making performance, and strategic thinking. The Brain Fuel index is calculated in the reverse (or inverse) proportion to the CO2 concentration and may be displayed as a readable segmented bar so that the user stays informed but is not overwhelmed by a large amount of measurements data or complicated air quality charts. The goal of the user experience may be not to show raw technical data but to rate air composition and for example to give practical recommendations such as 'Open the window', 'Turn on humidifier', 'Go for a walk', etc. Outputting data in a simple but informative way makes the system a powerful system to keep working productively on a high level—a user just takes a glance at the measuring device, or at an App notification (for example, please refer to the Notification section below) and learns how to improve their working environment instantly. Furthermore, the Brain Fuel index could be calculated based on several environmental factors, such as relative humidity, VOCs, CO, UV, etc. Thus, an integrated index may give a user complete but not complicated information about air composition and its influence on their health, wellbeing, and productivity.

Figure 1:
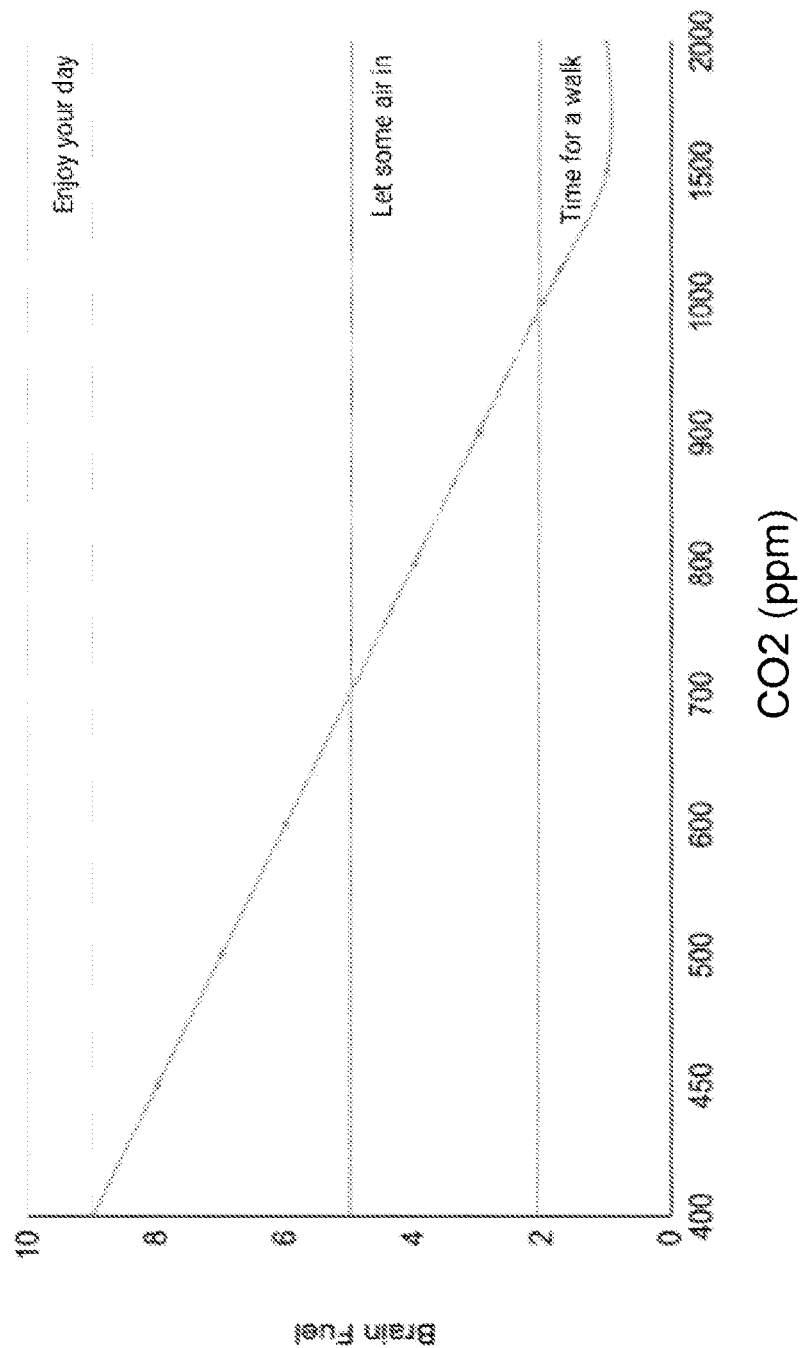
FIG. 1 shows an example plot of Brain Fuel score as a function of CO2 concentration (in ppm).

FIG. 1 shows an example plot of Brain Fuel score as a function of CO2 concentration (in ppm), and indicates some appropriate response actions as a function of CO2 concentration, or Brain Fuel score.

Example features of an example system that provides the user with real-time information about whether the air in their environment is suitable for productive work:

Measuring CO2 level in real-time.
Displaying the CO2 measurement results, e.g. in a human-readable way, e.g. on the Brain Fuel scale.
Connectivity between measuring device and smartphone/tablet/smart watch via Bluetooth interface.
Optional external module with additional sensors for one or more of: Volatile organic compounds (VOC), Formaldehyde (HCHO), Radon, ultraviolet (UV), carbon monoxide (CO), barometer, pm0.1 (particulate matter with an average aerodynamic diameter of up to 0.1 μm, referred to as ultrafine particle fraction) or ozone.
Optional GSM/ NarrowBand-Internet of Things (NB-IoT) module.
Detection of user activity type via smartphone/tablet application and app widget.
Phone application with charts, detailed data, and settings.
Push notifications and app widget for notifying users of changes in air composition.
Notifications in messages.
Single-button interaction.
Rechargeable built-in battery of measuring device.
Optimized power algorithm.
Wearable stylish case.
Ultrafine particulate matter, commonly referred to as pm0.1, consists of various suspended solids and/or liquid droplets having aerodynamic diameters up to 0.1 microns (100 nanometers).

Example Technical Parameters

Sensor model: Senseair Sunrise (from Senseair AB, Stationsgatan 12, Box 96, 824 08 Delsbo, Sweden).
Target gas: Carbon dioxide
Operating principle: Non-dispersive infrared sensors (for example, as supplied by Alphasense, Essex CM77 7AA, United Kingdom).
Operating range: 0-50° C., 0-85% RH (non-condensing)
Measurement range, accuracy: 400-5000 ppm, ±30 ppm
Device interfaces: Bluetooth, USB 3.0 (charging only)
Powering: In-built rechargeable battery/mains supply
Battery life: 150+ days
Display type: Monochromatic LCD, segment type
Possible Additional sensors: Humidity, temperature
Casing: Wearable/mountable to a surface (e.g., wall or ceiling)

A nondispersive infrared sensor (or NDIR sensor) is a simple spectroscopic sensor often used as a gas detector. It is non-dispersive in the fact that no dispersive element (e.g. a prism or diffraction grating as is often present in other spectrometers) is used to separate out (like a monochromator) the broadband light into a narrow spectrum suitable for gas sensing. The majority of NDIR sensors use a broadband lamp source and an optical filter to select a narrow band spectral region that overlaps with the absorption region of the gas of interest. In this context narrow may be 50-300 nm bandwidth.

The measuring device can be manufactured in various combinations of powering and casing configurations: a portable device with an in-built rechargeable battery; a portable device with an external powering; a mountable device with an in-built rechargeable battery a mountable device with external powering (e.g. including solar powered batteries).

Example aspects of an example industrial design:
Distinguishable case including the shape of the Reuleaux triangle in cross-section (see FIGS. 2, 3, 5, for example).
Single-button interaction (see FIG. 9, for example).
Cap held with an elastic band protecting the USB slot (see FIG. 3, for example).
Assorted colours and material finishing.
Keychain-sized case.
Out-of-the-box fastening solution (see FIGS. 3-5, for example).
Supplied with accessories (carabiner, lace, etc.).

Figure 2:
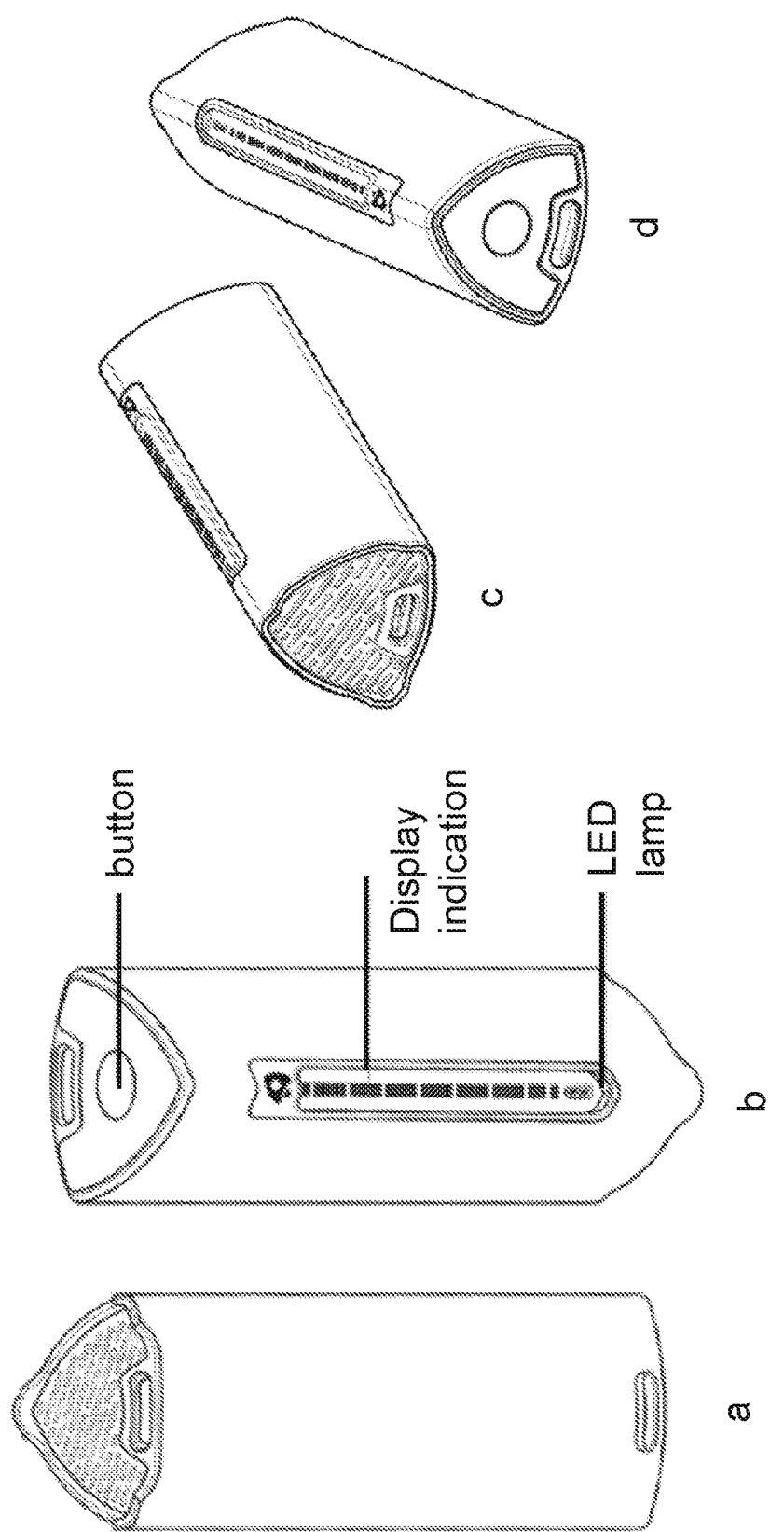
FIG. 2 shows various views and aspects of an example portable CO2 measuring device: (a) is a perspective view from the back and below; (b) is a perspective view from the front and above; (c) is a perspective view from the side and below; (d) is a perspective view from the front, side and above.

FIG. 2 shows various views and aspects of an example portable CO2 measuring device.

Figure 3:
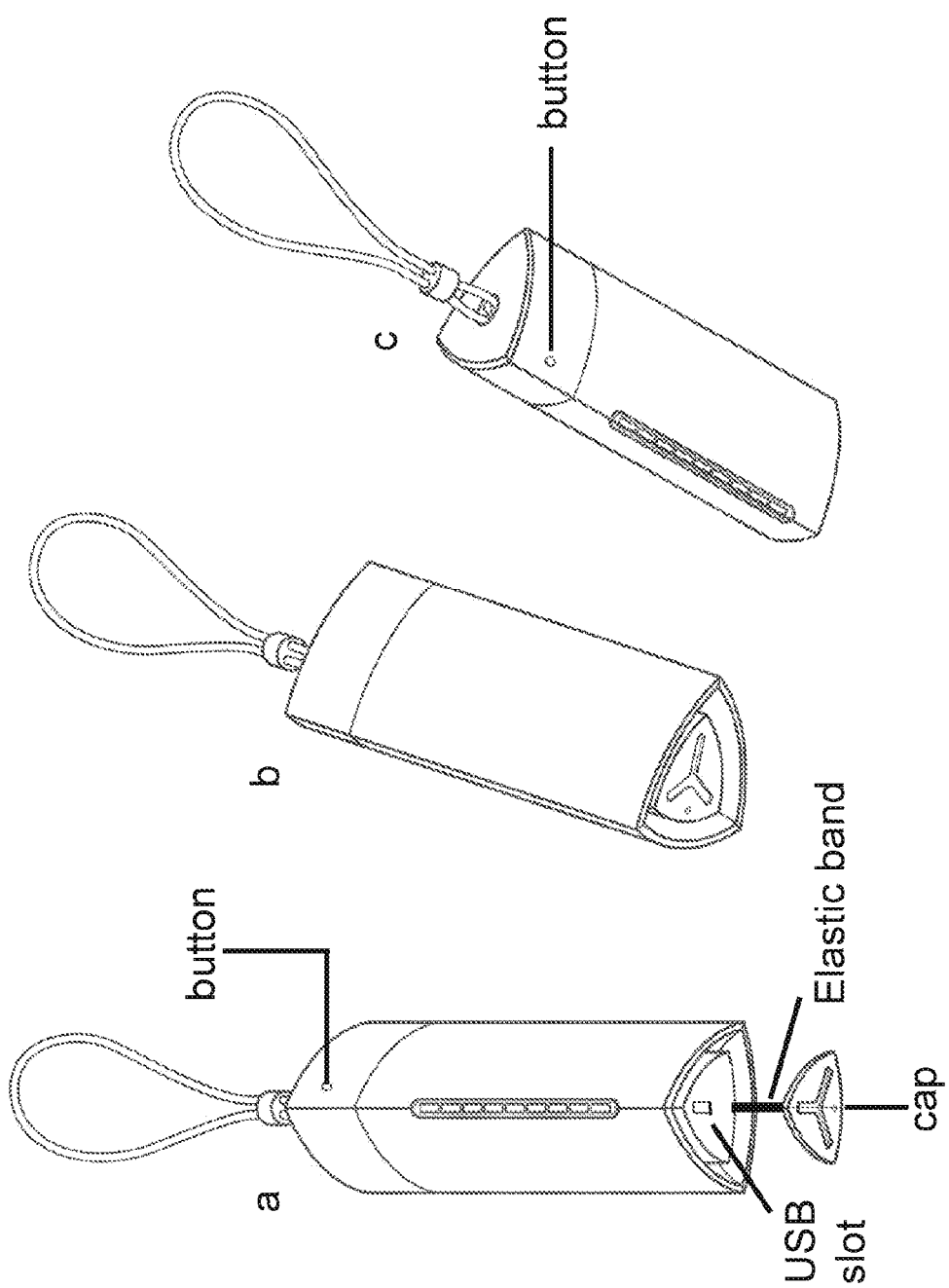
FIG. 3 shows an example of a portable CO2 measuring device including a fastener, the device including a cap which is attached with an elastic band; (a) shows the cap in the open configuration; (b) shows the cap in the closed configuration in which the cap protects a USB slot; (c) shows the portable CO2 measuring device which includes a cap (not shown), in a perspective view.

An example portable CO2 measuring device may include a cap or a cover which is attached with an elastic band, in which in the closed configuration the cap or a cover protects a USB slot. FIG. 3 shows an example of a portable CO2 measuring device which includes a cap which is attached with an elastic band (FIG. 3a), in which in the closed configuration the cap protects a USB slot (FIG. 3b).

Figure 4:
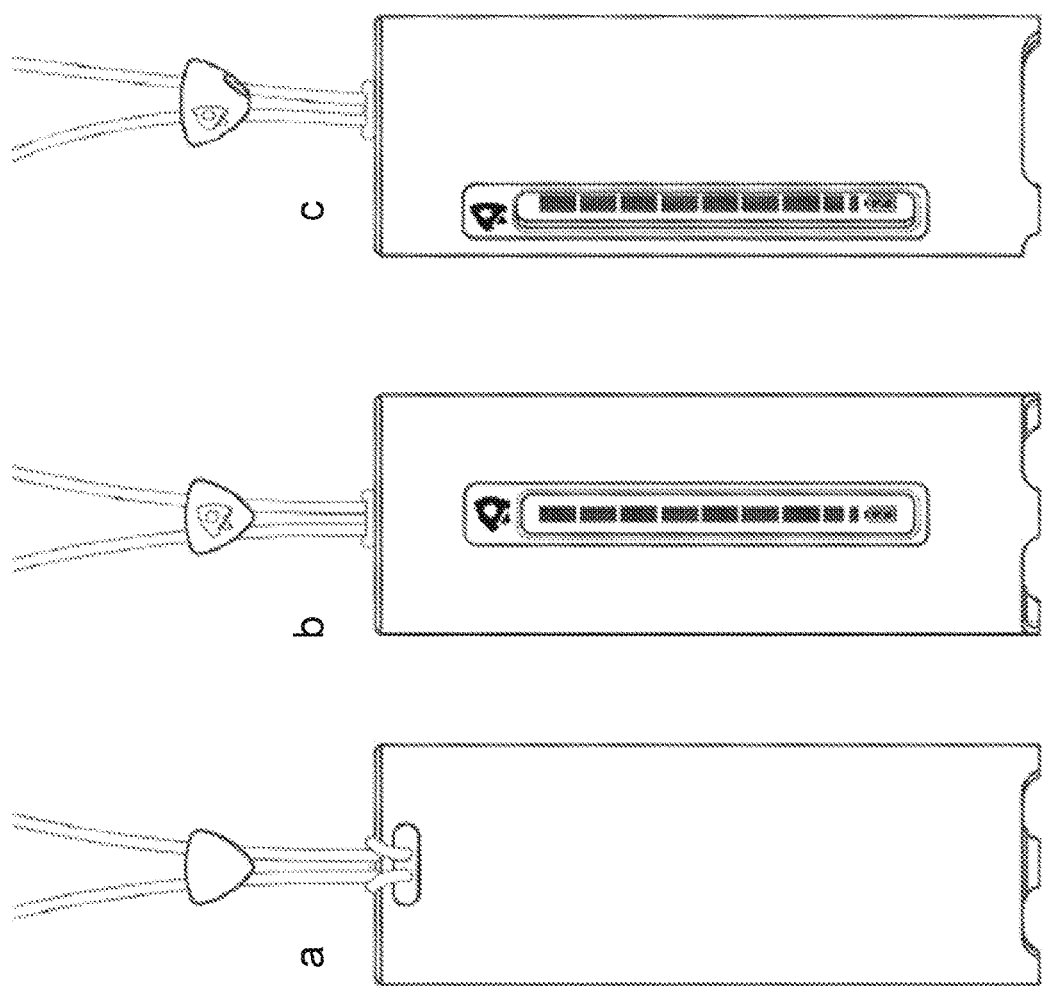
FIG. 4 shows an example industrial design of part of a fastening solution of an example portable CO2 measuring device: (a) shows a back view; (b) shows a front view; (c) shows a side view.

FIG. 4 shows an example industrial design of a fastening solution of an example portable CO2 measuring device.

Figure 5:
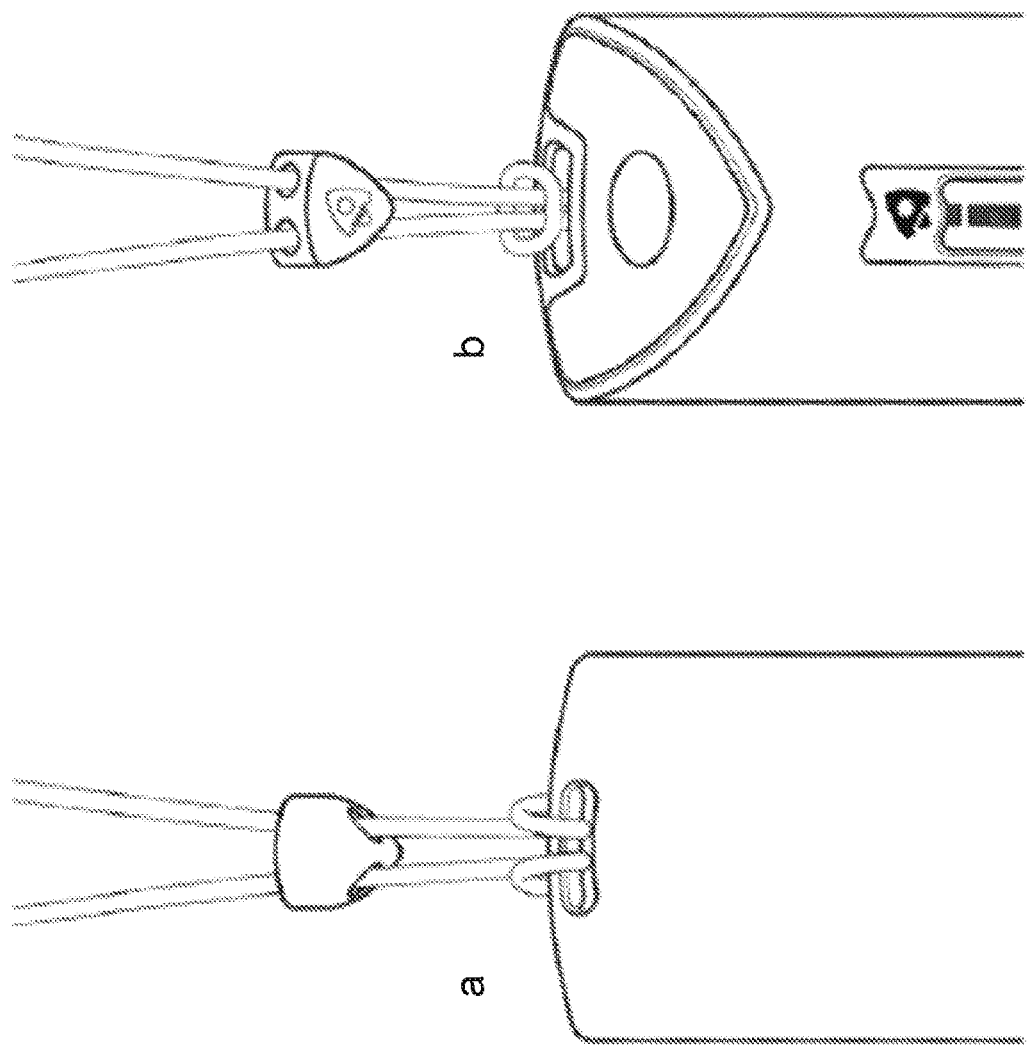
FIG. 5 shows an example industrial design of part of a fastening solution of an example portable CO2 measuring device: (a) shows a back view; (b) shows a front view.

FIG. 5 shows an example industrial design of a fastening solution of an example portable CO2 measuring device.

Examples of Indications of Carbon Dioxide Levels

Figure 7:
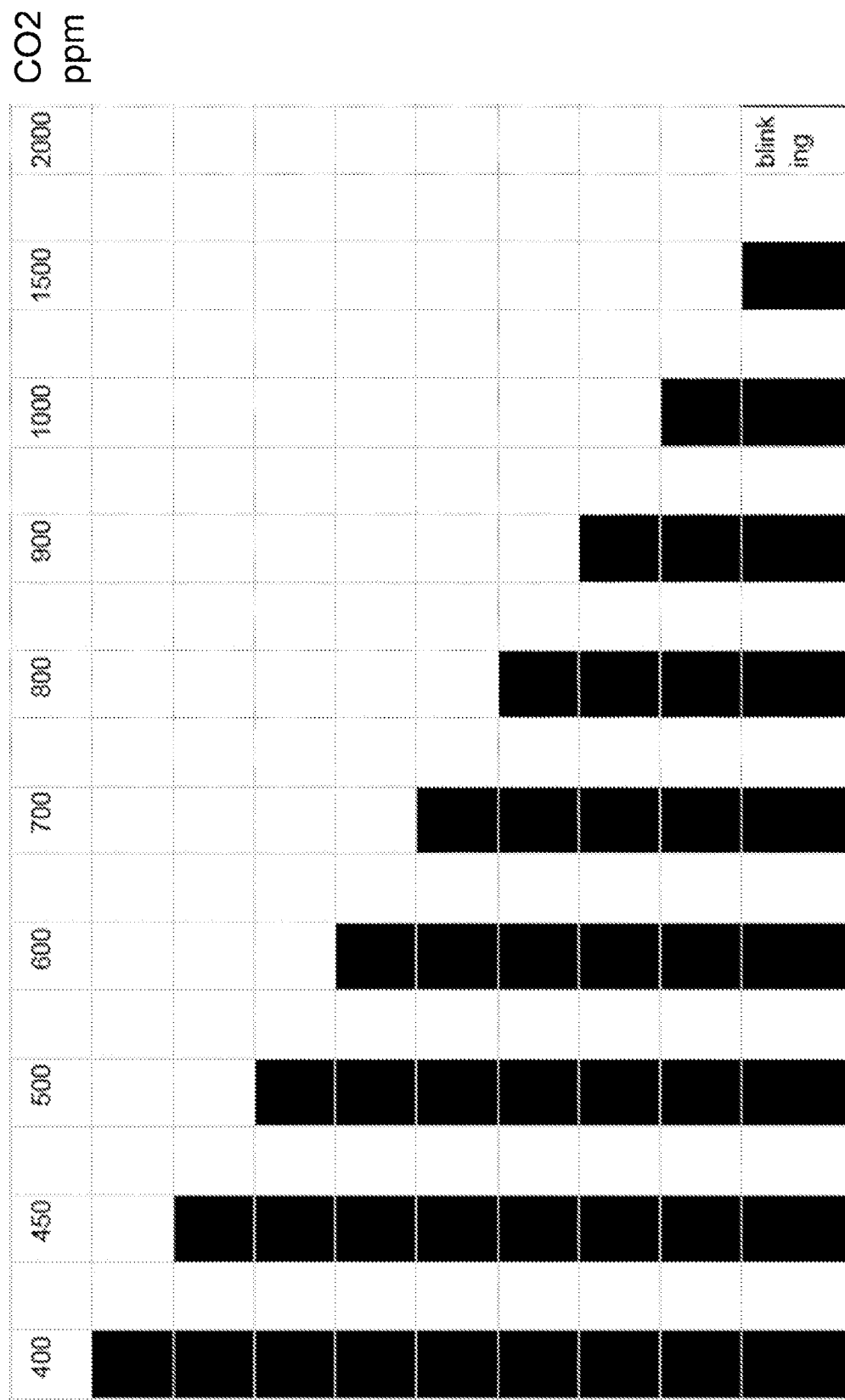
FIG. 7 shows example illumination status of nine active segments of a (e.g. LCD) display of a portable CO2 measuring device, to indicate the current CO2 level, where the CO2 level is in the range of 400 to 2000 ppm, where a black segment indicates that the segment is not light emitting, and a white segment indicates that the segment is light emitting.

A portable CO2 measuring device may include a (e.g. LCD) display; the (e.g. LCD) display may include nine active segments used to indicate the current CO2 level, for example as shown in FIG. 7 (i.e., the Brain Fuel level). The (e.g. LCD) display may be arranged to show that:

CO2 concentration in a range of 400-599 ppm is considered 'Ideal', i.e., the most optimal for thought process efficiency.

CO2 concentrations from 600 to 899 ppm are considered 'Fair' yet needing the user's attention as they might impair people's focusing and cognition.

When the CO2 concentration is in the range 900 ppm to 1500 ppm, the Brain Fuel level is considered 'Poor', and the user should take measures to get back to normal air composition to stay productive.

CO2 concentration values over 1500 ppm are critically high, and require an immediate user's reaction; they may be indicated by the last (e.g. LCD) display segment blinking; in addition a push notification may be sent to the user's smartphone.

Example (e.g. LCD) display indication logic of an example portable CO2 measuring device is shown in the table in FIG. 6.

Battery Charge Levels

The battery charge level may be indicated by a Battery segment of a display of a portable CO2 measuring device e.g. a part showing a battery icon. A battery icon may consist of two segments, such that:
  when the battery charge is between 51 and 100%, both battery segments are not illuminated,
  when the battery charge is between 10 and 50%, only one segment is not illuminated,
  when the battery charge is below 10%, only one segment is blinking.

The precise battery charge may be shown in a mobile device app, for example to the nearest 1% (e.g. please refer to Mobile device application section) of a mobile device in (e.g. wireless) connection with the portable CO2 measuring device.

Figure 8:
FIG. 8 shows examples of a portable CO2 measuring device (e.g. LCD) display, in which the battery icon displays the battery charge, and in which the other segments relate to the current CO2 level, illuminated in accordance with the example shown in FIG. 7: (a) shows both battery icon segments not light emitting, which corresponds to greater than 50% battery charge; (b) shows both battery icon segments not light emitting, which corresponds to greater than 50% battery charge; (c) shows one battery icon segment not light emitting, which corresponds to 10% to 50% battery charge; (d) shows zero battery icon segments not light emitting, which corresponds to less than 10% battery charge.
Figure 8:
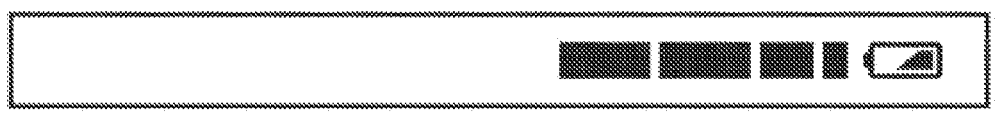
Figure 8:
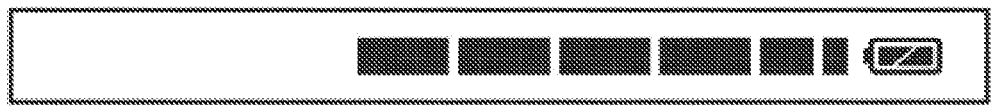
Figure 8:
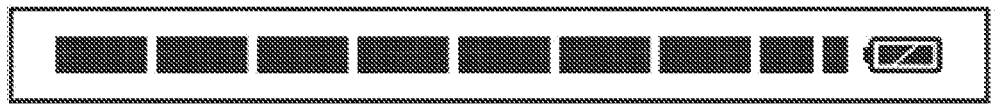

FIG. 8 shows examples of a portable CO2 measuring device (e.g. LCD) display.

User Interaction

Figure 9:
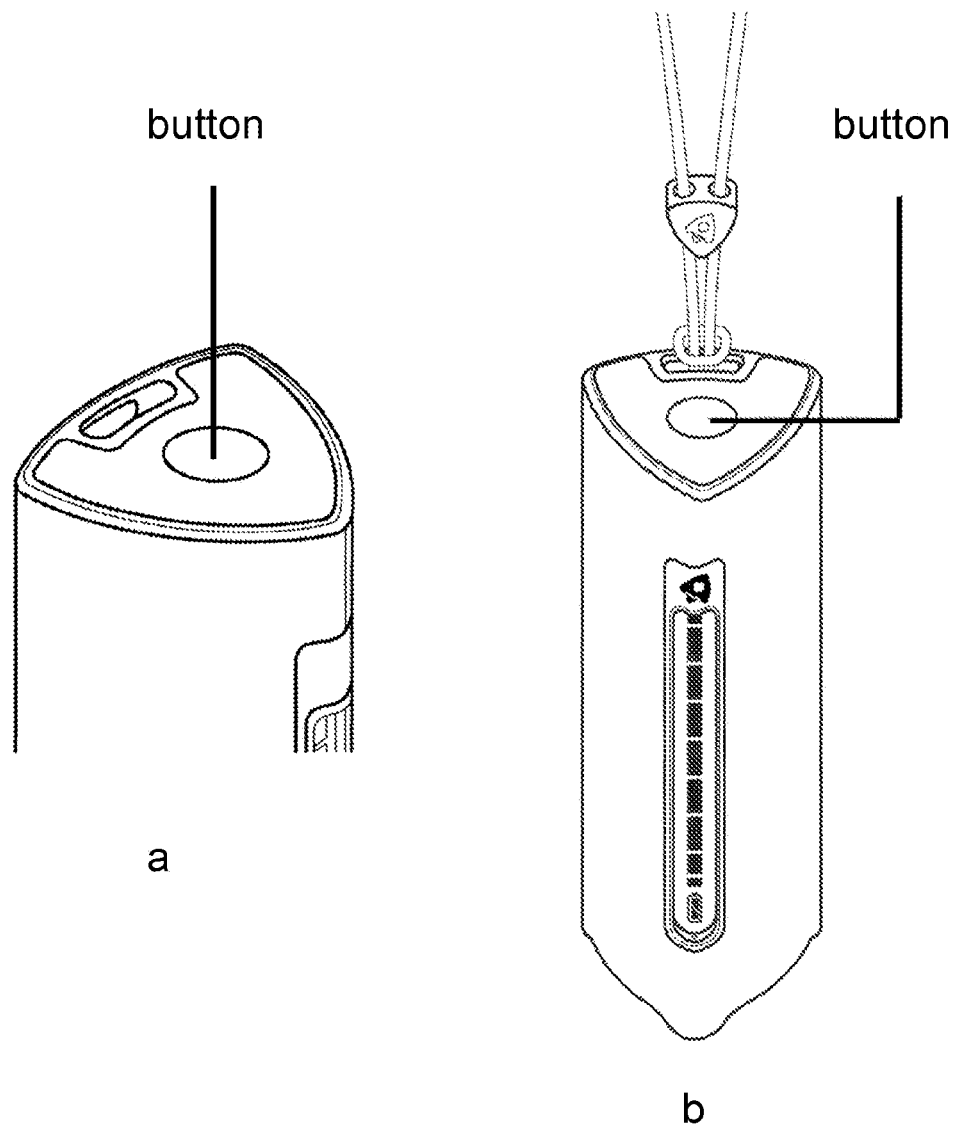
FIG. 9 shows an example CO2 measuring device including a button to turn the CO2 measuring device on or off: (a) is a view of the top part of the device, in perspective from a side; (b) is a perspective view of the device, from the top and the front, the device including a fastener.

In an example, user interaction (e.g. all user interaction) with a CO2 measuring device is performed by a user pressing a single button that is present (e.g. hidden under the top cover, or present in the top cover, of the CO2 measuring device) (see FIG. 9, for example). In an example, to turn the CO2 measuring device on or off, a user should press and hold the button until the CO2 measuring device display indicates switching the measuring device's state. In an example, while switching the CO2 measuring device on, the display segments appear one by one and blink once, then start indicating the current Brain Fuel level, or CO2 level. In an example, when the CO2 measuring device is turned off, all display segments fade one by one. FIG. 9 shows an example of a CO2 measuring device including a pressable button.

In an example, when turned ON, the CO2 measuring device checks if there is a paired device in the vicinity, and if any is present, the measuring device tries to establish a connection with the paired device. Regardless of the result of an attempted pairing, the measuring device may then start its 'Main cycle', which may include one or more of:
  periodical measurements of CO2 (and other environmental parameters as an option);
  continuously displaying the results of CO2 measurement;
  checking for any settings or firmware updates and performing a hard reset if required;
  checking battery level and initiating an alert if the battery level is too low;
  responding to the user interactions with the button.

Application Executable on a Mobile Device, or Executable on a Portable Device

The primary purpose of the app executable on a mobile device, or executable on a portable device (hereinafter—'the App') is to timely notify users of changes in air composition that might have a negative effect on their productivity.

The CO2 measuring device may connect to a mobile device (e.g. a mobile phone, smartphone or tablet computer) or to a portable device wirelessly (e.g. via Bluetooth) and may transmit its sensors' data to the App, where CO2 measurement data may be displayed, e.g. as a Brain Fuel scale. Users may be notified of CO2 concentration levels by push notifications sent to their mobile device (e.g. smartphone, mobile phone or tablet computer) or to a widget which provides an associated display on their mobile device's screen (e.g. a mobile phone's home screen). Being connected to the measuring device, the app (see for example FIGS. 10-14) may display the current Brain Fuel level or CO2 level and the (e.g. hourly) dynamics of the changing Brain Fuel level or CO2 level. The main screen of the App may provide users with an intuitively understandable indication of whether the air composition adds to their productivity:
  The current CO2 value, e.g. the Brain Fuel bar for the current CO2 value, may be displayed on the App's main screen on the mobile device.
  The main screen may be coloured correspondingly to the CO2 or Brain Fuel level, which makes the indication more comprehensible even at a glance: for low CO2 concentrations (corresponding to an 'Ideal' Brain Fuel level), the screen may be green; for fair but non-optimal CO2 concentrations (corresponding to a 'Fair' level) the screen may be yellow, and for higher CO2 concentrations which reduce cognitive capabilities significantly the App's main screen may be coloured red.
  On the main screen, the history of (CO2 or) Brain Fuel changes may be shown as well—scrolling the screen to the right, a user can get back to previous hours, days, weeks, or months to see how the (CO2 or) Brain Fuel levels have been changing over time. Using a finger pinching gesture on the touch screen applied to the (CO2 or) Brain Fuel scale, a user can see the (CO2 or) Brain Fuel levels for periods shorter than an hour.
  Short info texts on the main screen of the App on the mobile device may describe how the current air composition influences the user's brain capabilities and may prompt a user to let some air in from outside, or have a little walk to keep productivity, for example.

Figure 10:
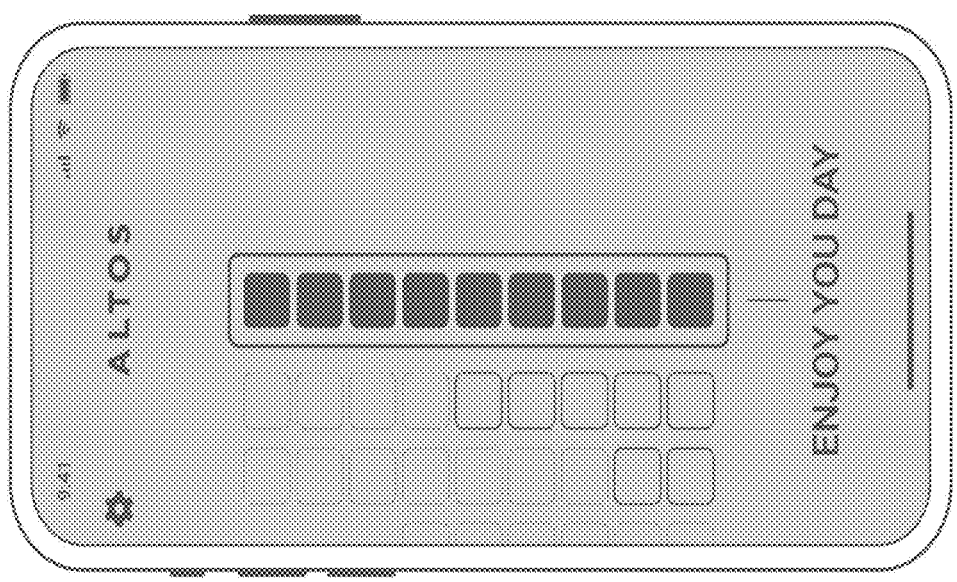
FIG. 10 shows examples of an application interface on a smartphone, in which a current Brain Fuel level is indicated: (a) the Brain fuel level is indicated by white segments; (b) the Brain fuel level is indicated by dark segments.
Figure 10:
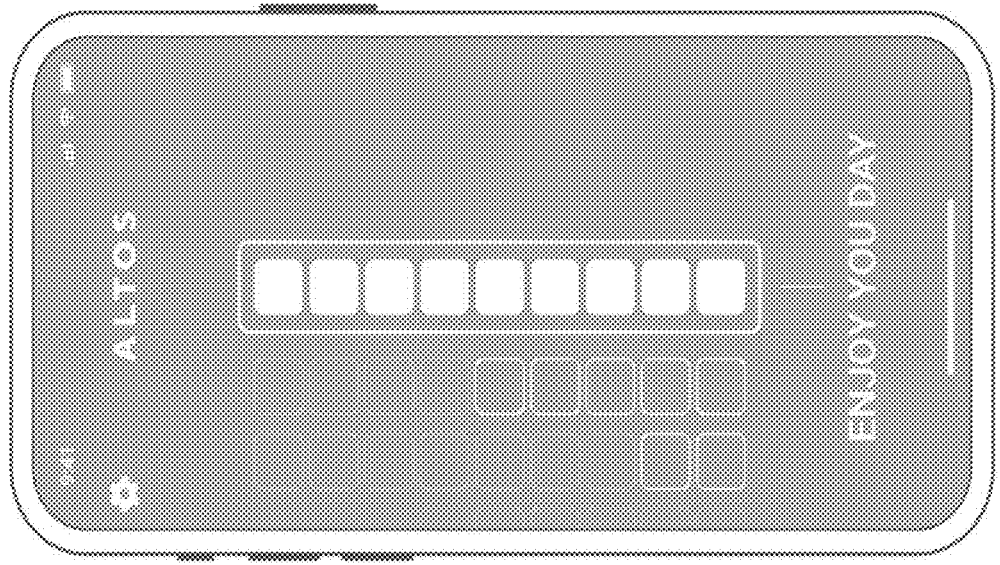

FIG. 10 shows examples of an application interface on a smartphone, in which a current Brain Fuel level is indicated.

Figure 11:
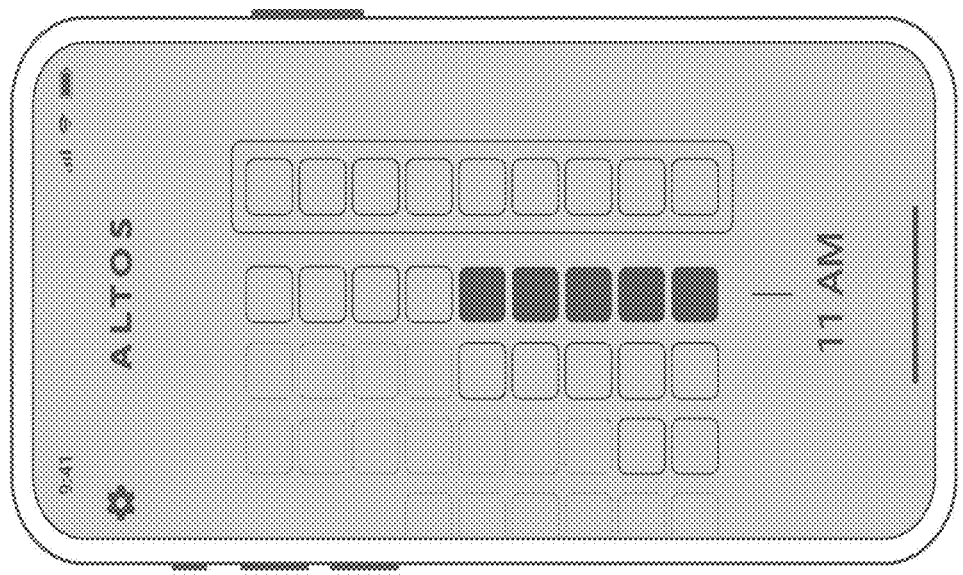
FIG. 11 shows examples of an application interface on a smartphone, in which Brain Fuel level is indicated as a function of time: (a) the Brain fuel level is indicated by white segments; (b) the Brain fuel level is indicated by dark segments.
Figure 11:
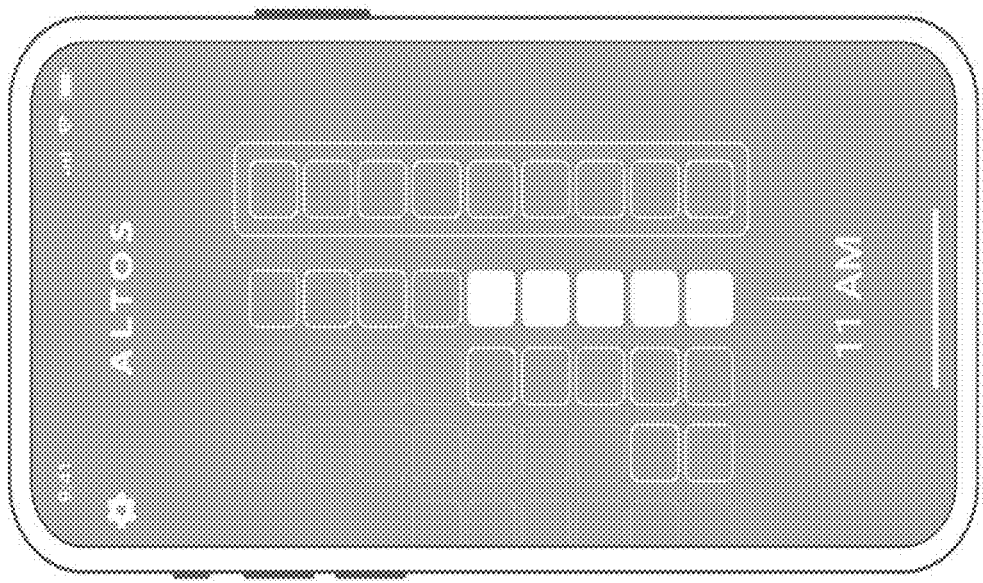

FIG. 11 shows examples of an application interface on a smartphone, in which past Brain Fuel levels are indicated.

Figure 12:
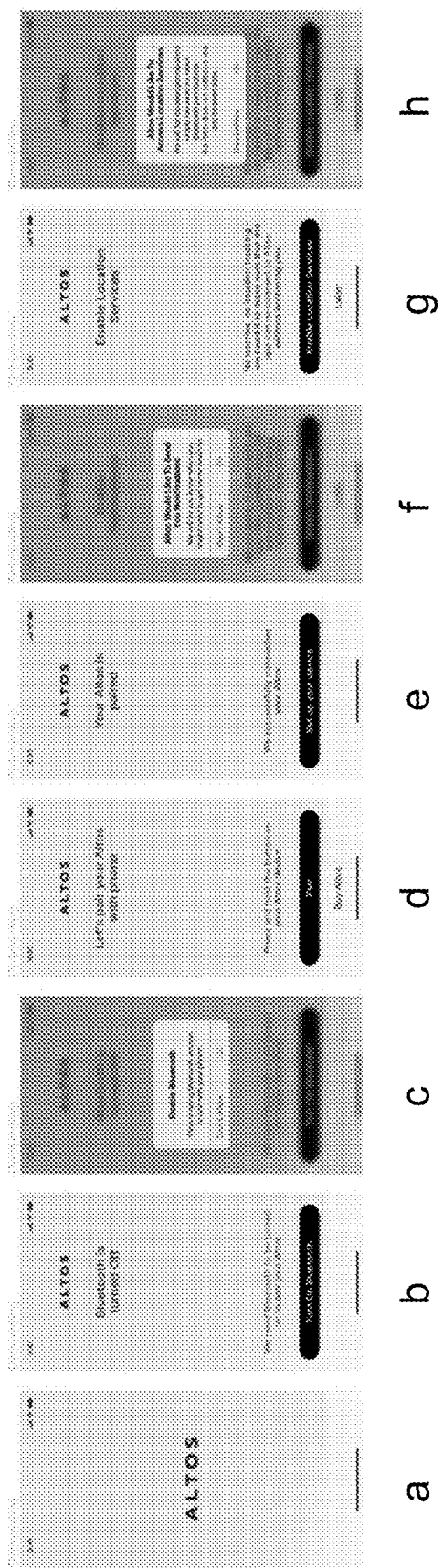
FIG. 12 shows examples of an application interface on a smartphone, in which screens displayed during pairing with a CO2 measuring device are shown.

FIG. 12 shows examples of an application interface on a smartphone, in which screens displayed during pairing with a measuring device are shown.

Figure 13:
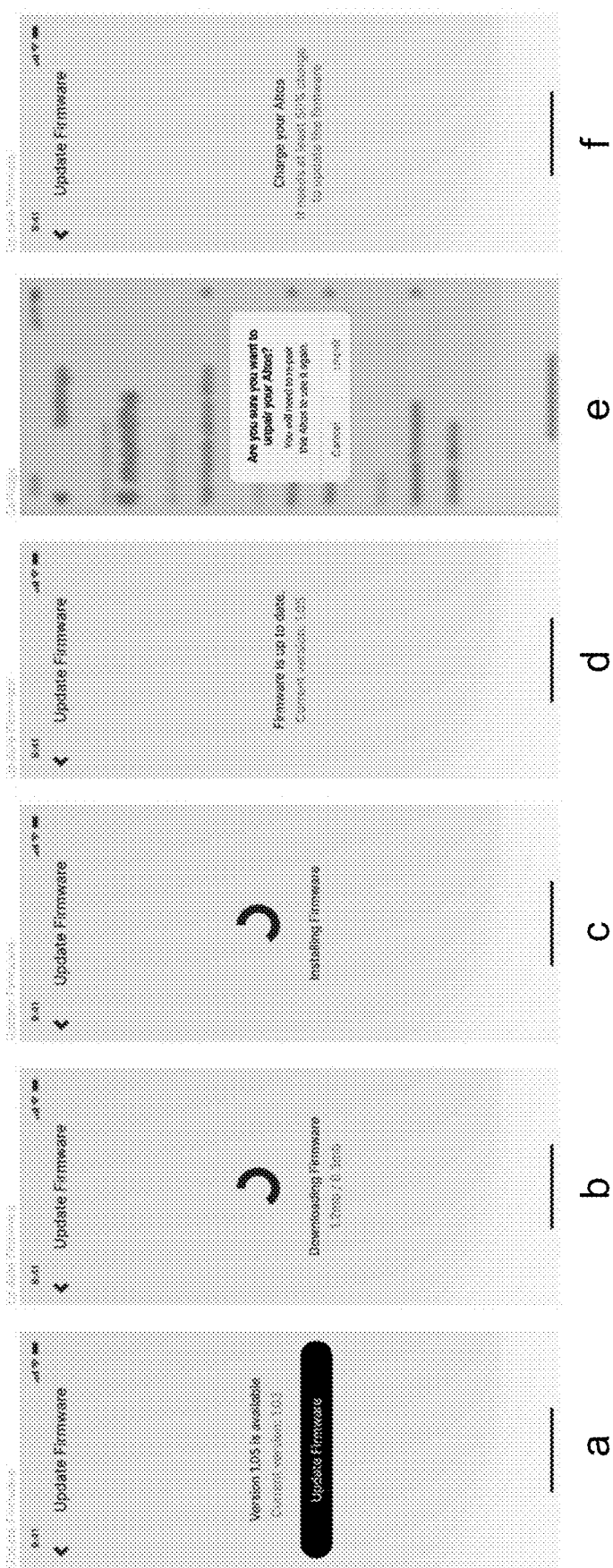
FIG. 13 shows examples of an application interface on a smartphone, in which screens displayed during updating measuring device firmware (a)-(d), (f), or during unpairing a CO2 measuring device (e), are shown.

FIG. 13 shows examples of an application interface on a smartphone, in which screens displayed during updating measuring device firmware (a)-(d), (f), or during unpairing a CO2 measuring device (e), are shown.

Figure 14:
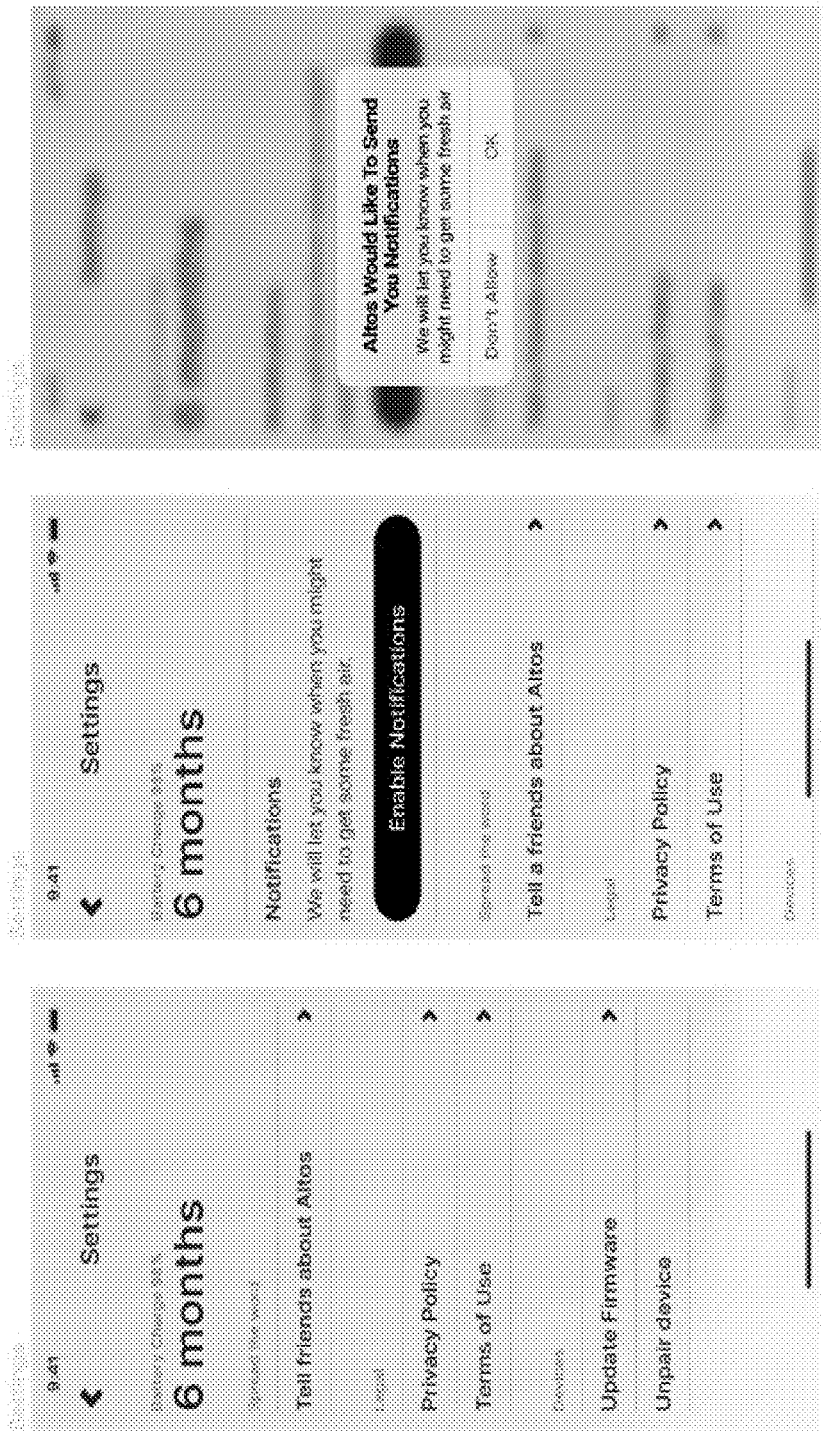
FIG. 14 shows examples of an application interface on a smartphone, in which screens displayed during changing measuring device settings are shown.

FIG. 14 shows examples of an application interface on a smartphone, in which screens displayed during changing measuring device settings are shown.

In an example app version, the user experience is extended with animated guidance on breathing techniques and a detailed dashboard of all environmental parameters received from the measuring device's sensors.

Figure 15:
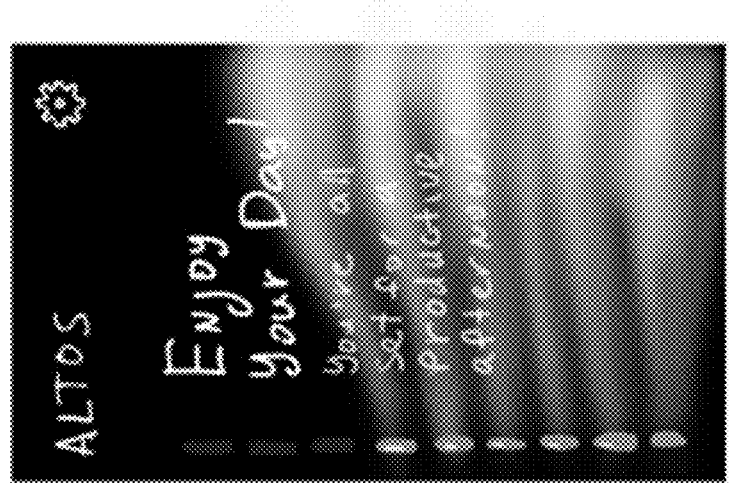
FIG. 15 shows an example app version executing on a smartphone, in which the user experience is extended with animated guidance on breathing techniques.

FIG. 15 shows an example app version executing on a smartphone.

In an example app version, the CO2 level or the Brain Fuel bar with its current value in the corresponding number of segments lit may be shown; some explanation may be shown to make the meaning of the Brain Fuel bar clearer, and push notifications may be sent when the air composition CO2 concentration changes. In addition, the main screen may display an animated wave helping users to practice breathing techniques—when the wave amplifies, inhale breath; when it narrows, exhale. In an example, to look at earlier CO2 or Brain Fuel levels, a user should swipe the screen right, opening the timeline of air composition states. In an example, to see the detailed information about current air composition, a user should swipe the screen up—the dashboard opens containing all the measured parameters in detail. This example app interface may make it more intuitive to understand the meaning of the Brain Fuel bar and more helpful for obtaining good user working performance. The breathing exercises make the user's mind clearer and help the user to concentrate on their tasks. A dashboard of air composition metrics may provide a fuller picture of what's happening with the user's cognitive processes at the moment.

Figure 16:
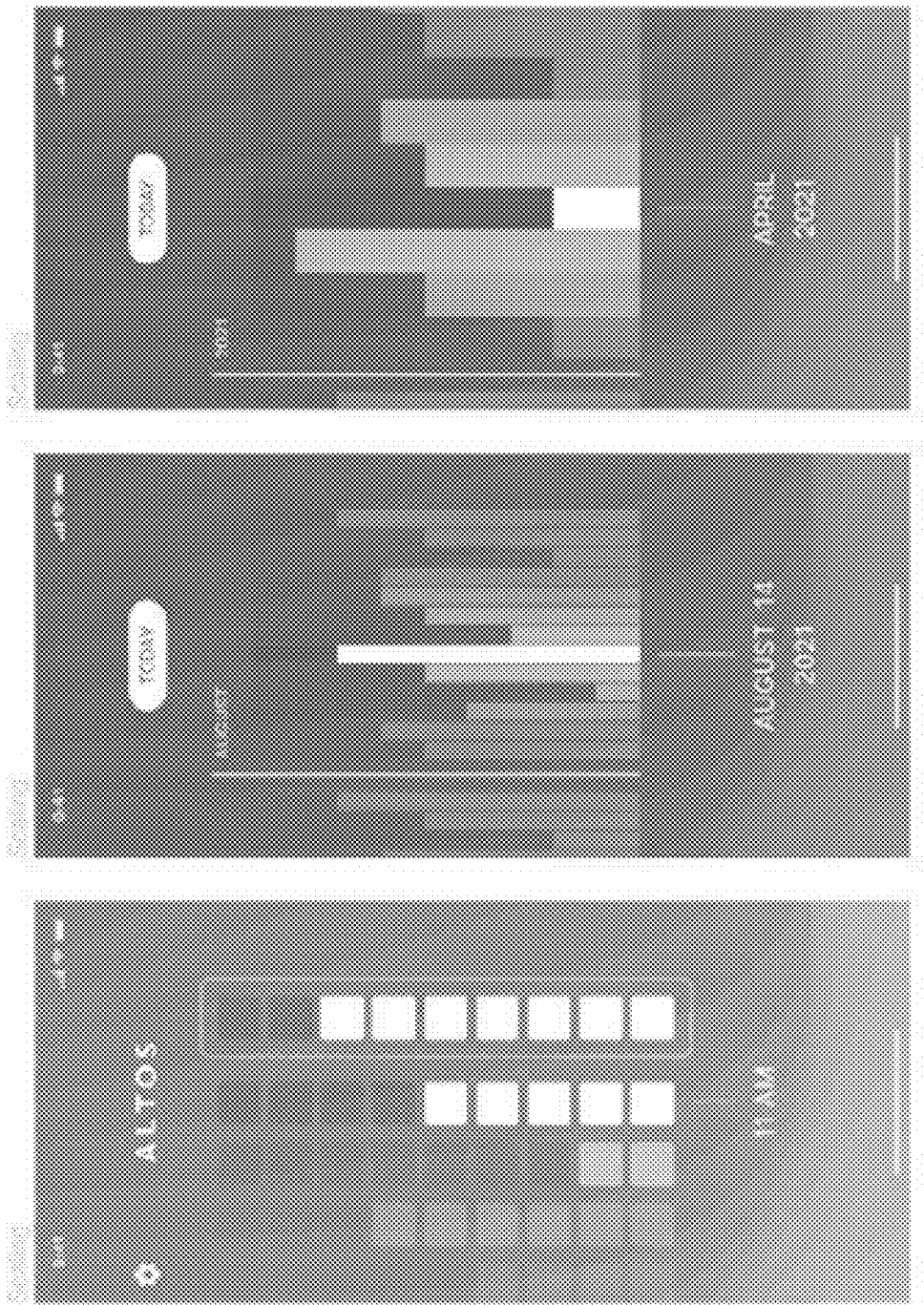
FIG. 16 shows examples of an application interface on a mobile device, in which user Brain Fuel level is displayed: (a) on an hour-by-hour timescale; (b) on a day-by-day timescale; (c) on a month-by month timescale.

An application interface may be displayed on a mobile device, in which average CO2 or user Brain Fuel level is displayed: (a) on an hour-by-hour timescale; (b) on a day-by-day timescale; (c) on a month-by month timescale. FIG. 16 shows examples of an application interface on a mobile device.

The App can be integrated with other healthcare, wellbeing, and lifestyle applications. For example, users can synchronize the App with their GitHub accounts or sports/health trackers to get an additional chart: productivity (GitHub commits number, exercise effectiveness, heart rate, etc.) superimposed on the CO2 concentration, and optionally productivity superimposed on sensor data from any other sensor incorporated in the portable CO2 measuring device. This information superimposed on the chart helps users to better understand the impact that their environment has on their productivity.

Connecting the App to The CO2 Measuring Device

In an example, to utilize the mobile application, a user should pair a mobile device (e.g. phone, tablet) with the CO2 measuring device in the following order:
Install the application on their mobile device.
Enable Bluetooth for the app.
Pair the CO2 measuring device with the phone following the App on-screen instructions.
Once paired, the measuring device may synchronize the CO2 measurement data on the measuring device with the App.
The CO2 or Brain Fuel scale on the App's main screen displays data relating to data received by the app from the measuring device, e.g. from the measuring device sensors.

Notifications

The CO2 measuring device may notify users of the air composition states in several ways, for example:
by showing the CO2 or Brain Fuel level on the measuring device's display,
by displaying the CO2 or Brain Fuel level in the App on the mobile device,
by sending push notifications to the user's mobile device (e.g. phone or smart watch),
by displaying the CO2 or Brain Fuel level on the app widget on the mobile device (e.g. phone's) home screen.

Push Notifications

Figure 17:
FIG. 17 shows examples of notification by an application on a smartphone.

When the CO2 concentration reaches the 'Fair' or 'Poor' range (refer to Brain Fuel section), the App may send or receive push notifications at the user's smartphone (see for example FIG. 17). These notifications are aimed to provide users with a timely notice and a friendly tip, thus informing a user of changes in air composition and encouraging the user to keep their environment helpful. FIG. 17 shows examples of notification by an application.

App Widget

Figure 18:
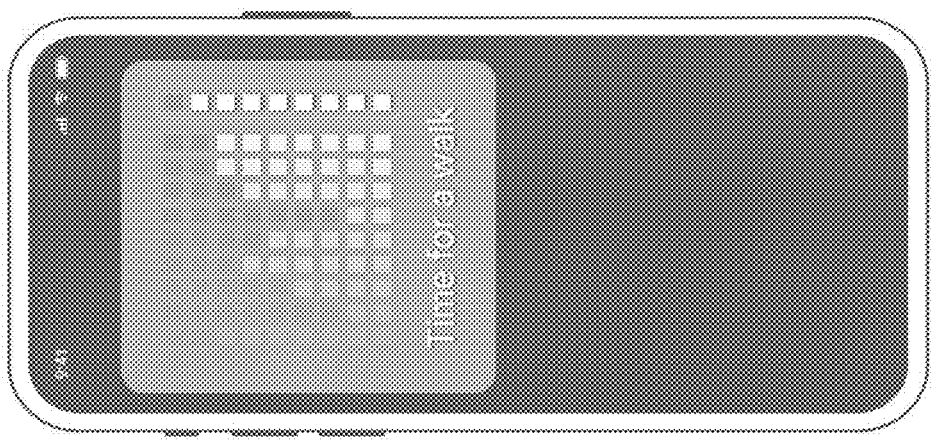
FIG. 18 shows examples of Application widgets providing relevant information about the air a user is breathing.
Figure 18:
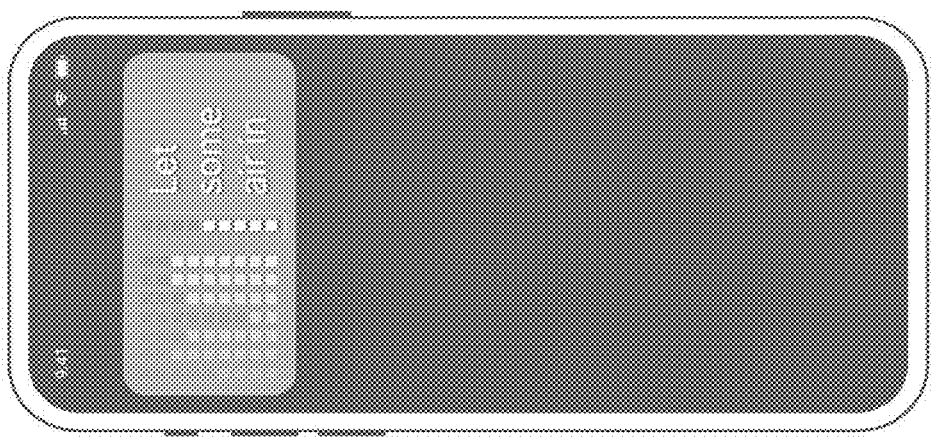
Figure 18:
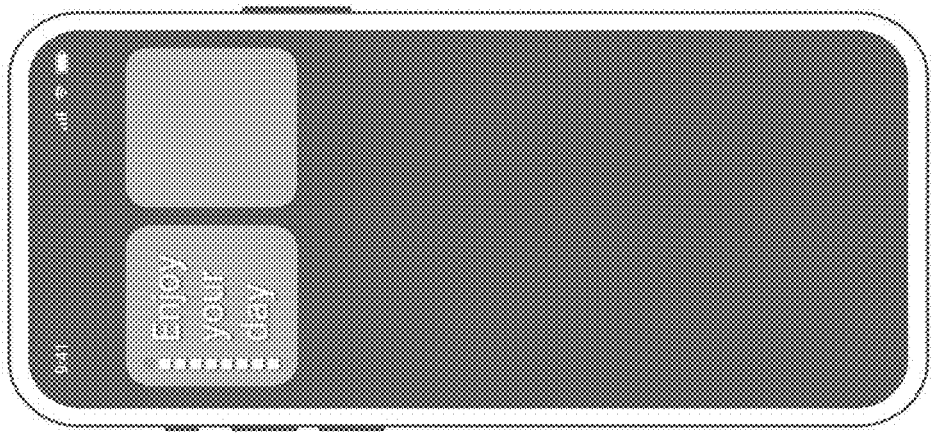

The App widget's (see for example FIG. 18) purpose is to let users know relevant information about the air they are breathing, with no need to open the App—relevant information is provided on the mobile device (e.g. phone) home screen. The widget may duplicate a CO2 level or Brain Fuel bar displayed in the App (and on the CO2 measuring device display) so that the user can keep an eye on relevant information about the air they are breathing, even when the App is in the background on the mobile device. FIG. 18 shows examples of Application widgets providing relevant information about the air a user is breathing.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A system including a portable CO2 measuring device and a mobile device, the mobile device including a processor and a display, the mobile device storing software, the mobile device configured to communicate with the portable CO2 measuring device, the portable CO2 measuring device configured to measure CO2 measurement data, and wherein the portable CO2 measuring device is configured to perform periodical measurements of CO2 to measure the CO2 measurement data, wherein the software is executable on the mobile device to receive the CO2 measurement data from the CO2 measuring device, and to display CO2 measurement results derived from the CO2 measurement data on the display of the mobile device.

2. The system of claim 1, wherein the portable CO2 measuring device is configured to directly measure CO2 concentration.

3. The system of claim 2, wherein the portable CO2 measuring device is configured to directly measure CO2 concentration in real time.

4. The system of claim 1, wherein the portable device includes a non-dispersive infrared sensor arranged to measure CO2 concentration, to measure CO2 measurement data.

5. The system of claim 1, wherein the CO2 measurement data includes Brain Fuel level.

6. The system of claim 1, wherein when CO2 measurement data indicates CO2 concentration values over 1500 ppm, a notification is sent to the mobile device.

7. The system of claim 1, wherein the portable CO2 measuring device includes a (e.g. LCD) display.

8. The system of claim 7, wherein when CO2 measurement data indicates CO2 concentration values over 1500 ppm, a unique signal is provided on the (e.g. LCD) measuring device display in response, e.g. a blinking segment.

9. The system of claim 7, wherein the portable CO2 measuring device is configured to display on its display an indication that is inversely proportional to a CO2 level measured by the portable CO2 measuring device.

10. The system of claim 1, wherein the maximum dimension of the portable device that measures the CO2 concentration is less than 15.0 cm; or wherein the maximum dimension of the portable device that measures the CO2 concentration is less than 10.0 cm; or wherein the maximum dimension of the portable device that measures the CO2 concentration is less than 5.0 cm.

11. The system of claim 1, wherein the portable device that measures the CO2 concentration has a weight less than 100 g; or wherein the portable device that measures the CO2 concentration has a weight less than 50 g; or wherein the portable device that measures the CO2 concentration has a weight less than 25 g.

12. The system of claim 1, wherein the system includes an external portable module with additional sensors for sensing one or more of: Volatile organic compounds (VOC), Formaldehyde (HCHO), Radon, ultraviolet (UV), carbon monoxide (CO), pressure, pm0.1 or ozone, and the external portable module is configured to transmit related measurement data to the mobile device for display.

13. The system of claim 1, wherein the portable device is also an air composition measuring device and is configured to measure one or more other quantities (or all quantities) selected from VOCs, HCHO, Radon, CO, UV, ozone, air pressure, pm0.1, using respective sensors, and to transmit related measurement data to the mobile device.

14. The system of claim 1, wherein the mobile device is configured to calculate an index based on received sensor data from all sensors which transmit sensor data to the mobile device, and to display the index on the screen of the mobile device.

15. The system of claim 1, wherein the system includes a GSM/NarrowBand-Internet of Things (NB-IoT) module, wherein the module is within the portable device, or wherein the module is outside the portable device and outside the mobile device.

16. The system of claim 1, wherein the portable device includes humidity and/or temperature sensors, the sensors configured to transmit sensor data to the mobile device.

17. The system of claim 1, wherein the portable device has a Reuleaux triangle shape in cross-section.

18. The system of claim 1, wherein the mobile device is configured to communicate with the portable CO2 measuring device wirelessly.

19. The system of claim 18, wherein the mobile device is configured to communicate with the portable CO2 measuring device using a short-range wireless connection (e.g. Bluetooth).

20. The system of claim 1, wherein the mobile device is configured to provide an application widget providing CO2 measurement results on a home screen of the mobile device.

21. The system of claim 1, wherein the mobile device is a mobile phone, a smartphone, a tablet computer, or a smart watch.

22. The system of claim 1, wherein the mobile device is configured to synchronize the App with a GitHub account or sports/health trackers to display an additional chart: e.g. productivity superimposed on the CO2 concentration, and optionally productivity superimposed on sensor data from any other sensor incorporated in the portable CO2 measuring device.

* * * * *